Nov. 15, 1927. 1,649,429
W. C. WHITCOMB ET AL
LOCOMOTIVE
Filed June 13, 1924  2 Sheets-Sheet 2
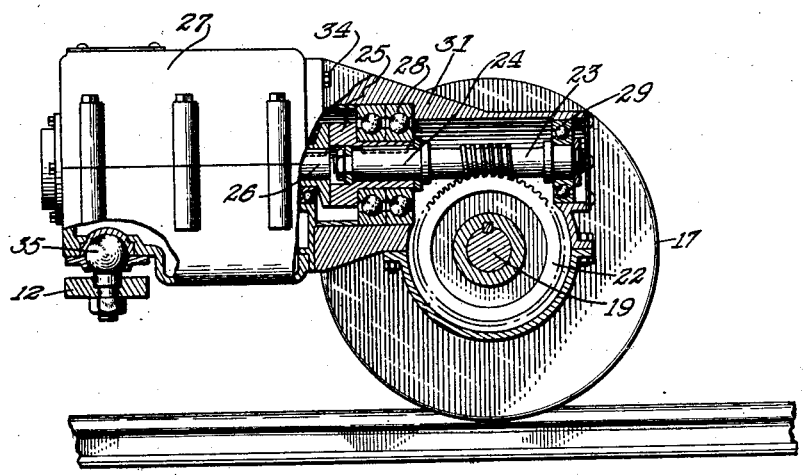
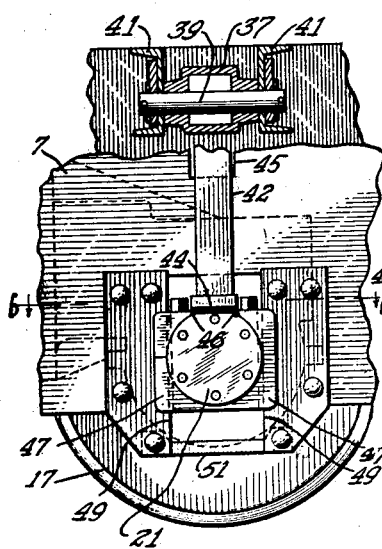
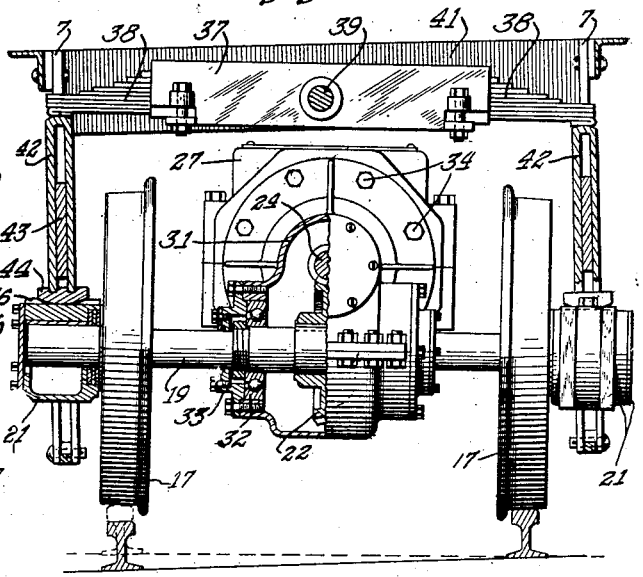
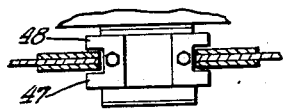
Inventors:
William C. Whitcomb
William F. Eckert
By Wilson & McLane Attys.

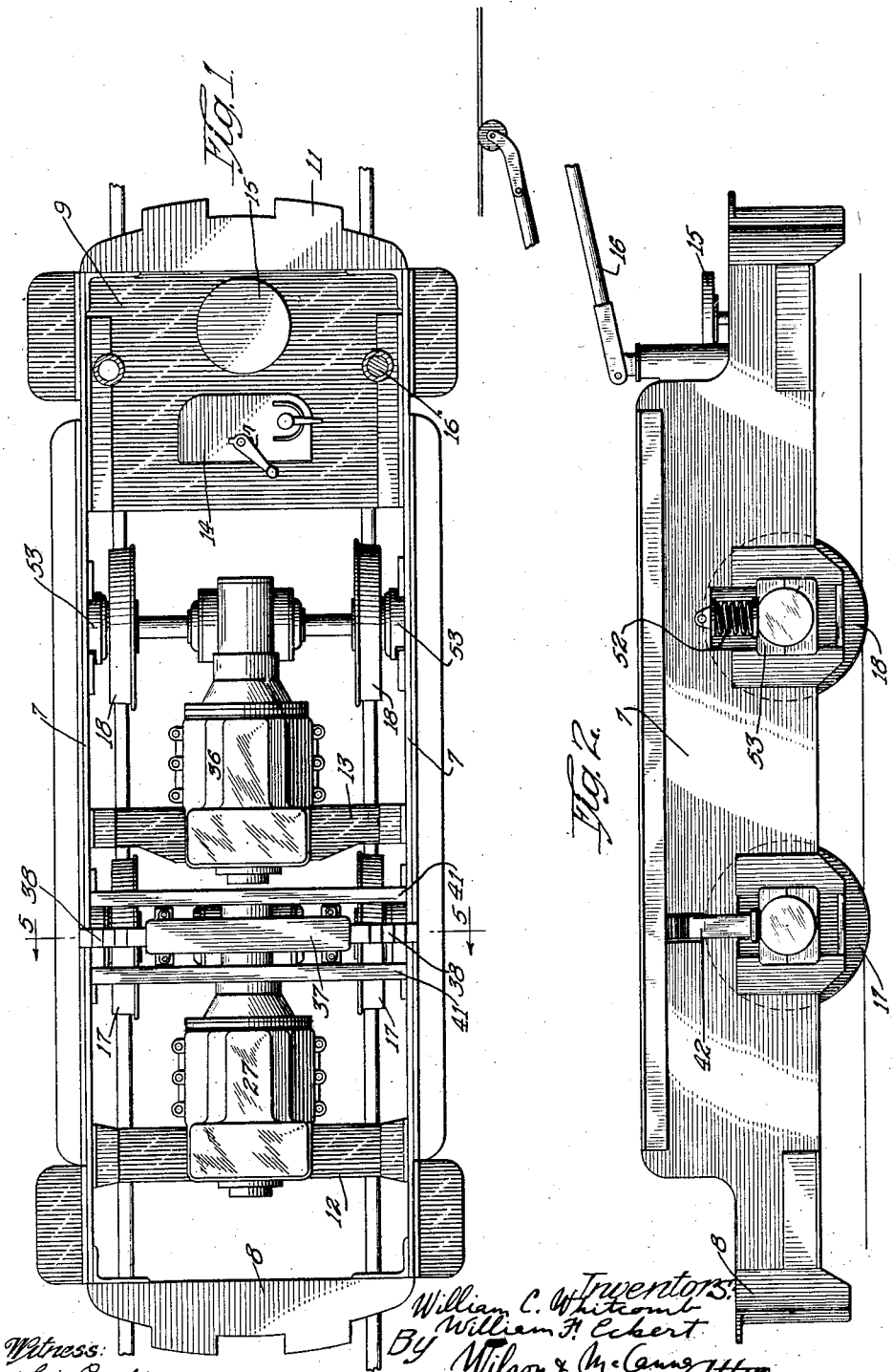

Patented Nov. 15, 1927.

1,649,429

UNITED STATES PATENT OFFICE.

WILLIAM C. WHITCOMB AND WILLIAM F. ECKERT, OF ROCHELLE, ILLINOIS, ASSIGNORS TO GEO. D. WHITCOMB COMPANY, OF ROCHELLE, ILLINOIS, A CORPORATION OF ILLINOIS.

LOCOMOTIVE.

Application filed June 13, 1924. Serial No. 719,734.

This invention pertains in general to railway rolling stock, and more particularly to locomotives of the type especially adapted for mine work, road building and other industrial purposes. Our invention, is not, however, limited to these uses, but is applicable to locomotives generally.

One of the primary objects of our invention is to provide an improved locomotive, more flexible and economical in operation than the small steam locomotives, and especially adapted for mine, road and industrial purposes. We have also aimed to provide a locomotive of this type superior in design, capacity, and sturdiness, and yet so flexible as to readily and effectually conform to the varying conditions and requirements of service.

More particularly, our invention contemplates the provision of novel driving units plates the provision of novel driving units or trucks and the suspension of a frame or car body on such trucks in a particularly advantageous manner, insuring smooth and flexible locomotion over all kinds of tracks, and especially those of an irregular character. Our invention is therefore, admirably suited to those conditions frequently found where the railway track is for temporary use only, as for example in road building and other construction work, or under such conditions as in mines and other places where due to the nature of the road bed, considerable difficulty and expense is attendant upon laying a good track.

In furtherance of the foregoing, we have provided a locomotive characterized by a front and a rear driving unit or truck, each comprising a pair of drive wheels and a motor connected by gearing to the wheel axle, and by a compensating suspension of the locomotive frame or body on these trucks. Such suspension is at two points on one truck, preferably through the intermediary of journal springs, and at a single point on the other truck through the agency of a transverse equalizing saddle. The motor for each truck is supported at one end on the axle and at its opposite end on the locomotive frame, preferably through means of a universal connection, such as a ball and socket. By reason of this arrangement, the driving thrust is imparted through the universal connections instead of through the pedestal jaws. This arrangement also allows universal movement of each truck or driving unit about the center of the ball and socket connection and with respect to the locomotive frame, which is especially conducive to smoothness of locomotion. The compensating suspension of the locomotive frame on the driving units or trucks is also an important factor in promoting flexibility of the locomotive structure when passing over irregular and uneven tracks, and also for conforming to such other conditions as impose unusual torsional and lateral strains and stresses on the locomotive frame and the connections between the frame and trucks.

A further object of our invention is to provide a compact driving unit or truck, which relieves lateral strains and which is composed of but comparatively few parts arranged in a practical and efficient manner for transmitting the drive under the above-mentioned conditions for which the present locomotive is intended.

Other objects and attendant advantages will be appreciated by those skilled in the art as the invention becomes better understood by reference to the following description when considered in connection with the accompanying drawings, in which—

Figure 1 is a plan view of a locomotive embodying our invention;

Fig. 2 is a side elevation of the locomotive;

Fig. 3 is a vertical, longitudinal section through one of the motor-driven trucks;

Fig. 4 is a fragmentary side elevation partly in vertical section, showing the equalizer suspension of the car body on one of the trucks;

Fig. 5 is a transverse sectional view through the locomotive taken substantially on the line 5—5 of Fig. 1, illustrating the action of the equalizer suspension and showing half of the driving truck in elevation; and Fig. 6 is a detail horizontal section, taken substantially on the line 6—6 of Fig. 4.

In illustrating our invention, we have taken as an example its application to a mine locomotive, electric motor driven; and in the drawings we have shown only such parts of the locomotive as are necessary for an understanding of the present invention. Our invention is applicable, however, to locomotives for other purposes, and propelled by power devices other than electric motors. Consequently, the term "motor" as used herein is intended in its broadest sense, and likewise the term "locomotive frame" as meaning the frame or car body of any railway vehicle designed to run on a railway track and to be propelled by a power device carried on the vehicle.

Referring more particularly to the drawings, the locomotive frame which likewise constitutes the body, is made up of side plates 7 rigidly joined by a front bumper 8, a rear controller platform 9, rear bumper 11 and intermediate transverse beams 12 and 13. The hood or other top structure overlying the frame is omitted for purpose of clarity. A controller box 14, operator's seat 15 and trolley pole 16 are shown on the controller platform, which is disposed at the rear end of the locomotive. It will be manifest that the particular frame structure shown is typical of the low narrow gage locomotives adapted for mine and other industrial purposes, altho it should be borne in mind, as mentioned above, that our invention is of broader application than to this particular type of locomotive.

The locomotive frame is carried on a front and a rear pair of driving wheels 17 and 18 respectively, and each pair of wheels is driven by a motor, the wheels and motor being associated in a novel manner in a driving unit or truck. These driving units per se are of similar construction, and have the same driving thrust connection with the locomotive frame, but the latter is suspended on each truck in a different manner. That is, the frame is suspended at two laterally spaced points on the rear truck and at a single median point on the front truck, providing a compensating suspension which will be described more fully hereinafter. The driving units or trucks, however, being identical in construction, a description of one will suffice, and similar parts in both units will be designated by similar reference characters, except where the contrary appears for purpose of distinguishing one unit or parts thereof from another.

Referring to Figs. 3 to 6 inclusive, it will be seen that the axle 19 for the front driving wheels, carries journal boxes designated generally by 21, through which the locomotive frame is supported, as will be described later. Medially upon the axle is fixed a worm gear 22 with which meshes a driving worm 23, on a horizontally disposed axis above the axle. The worm shaft 24 is concentric with and secured by means of a suitable coupling 25, to the drive shaft 26 of an electric motor 27. The worm shaft 24 is journaled at opposite ends in heavy duty radial-thrust bearings 28 and 29 carried in a casing designated generally by 31, which in turn, is journaled on the axle 19 through means of suitable bearings 32 as shown in Fig. 5. Said casing 31 is held against displacement longitudinally on the axle 19 by suitable means, such as a retaining collar 33 for each casing bearing 32. The casing 31 and the motor 27 are rigidly secured together by bolts 34, so that the motor and driven parts are closely coupled for direct transmission of the drive, and are inclosed in a substantially unitary casing structure supported at one end on the axle, thus constituting a driving unit. The opposite end of this motor-driven unit is supported on the transverse beam 12 through the agency of a pivotal or universal connection, preferably in the form of a ball and socket 35, the ball member being in this instance fixed to the beam 12 medially between the ends thereof. In the case of the rear driving unit, the motor 36 thereof is supported at its front end on the transverse beam 13 through means of a similar ball and socket connection.

The suspension of the locomotive frame on the front driving unit or truck is through an equalizing device, which will now be described, reference being had more particularly to Figs. 4 and 5. This equalizing or compensating suspension comprises an equalizing lever or saddle at present in the form of a cast metal body 37, in the ends of which are secured laminated springs 38. The equalizer lever 37 is fulcrumed medially on a pin 39 disposed on the longitudinal center line of the locomotive frame and supported at its forward and rear ends on transverse channels 41. The outer end of each of the spring elements 38 rests on the top of a translating link 42, each of which in turn rests at its lower end on the adjacent journal box. Each link is at present in the form of a heavy metal strap bent upon itself, so as to straddle a portion 43 of the side plate 7, and the ends of each link are secured in a shoe 44 having an arcuate underface resting on its respective journal box in a groove therein permitting the journal box to move laterally with respect to the shoe. Said translating links are held at their upper ends against displacement by the contiguous walls 45 of a cutaway in the side plate 7 through which the link passes, and at its lower end by the shoe 44 seating in a recess 46 in the top of the journal box. Each journal box has a limited amount of lateral movement with respect to the frame, the extent of this movement being determined by outer and inner flanges or guides 47 and 48, which straddle the pedestal jaws 49. These jaws are at present of a laminated metal plate construction rigid with respect to the side plates of the frame and connected at the bottom by a jaw bit 51.

This construction permits the journal boxes to move freely in a vertical direction and to tilt with the driving truck about a horizontal axis extending longitudinally of the locomotive and intersecting the ball joint 35. Such tilting occurs when the truck passes over uneven track, of which one rail is lower than the other, as shown in Fig. 5. Under such condition, the truck as a unit swivels upon and about the ball 35, and this movement occurs without imposing harmful strains and stresses on the frame and parts suspending the frame on the unit. Furthermore, this construction allows the driving unit or truck to swing laterally with respect to the frame, the purpose of this lateral swinging movement in an arc being to permit the wheels of the driving truck to properly follow turns and bends in the track and to prevent excessive strain, jar and wear on the frame structure and journal boxes. The limits of this lateral movement may, of course, be suited to the particular design of locomotive and the purpose for which it is intended; consequently, the particular dimensional limitation shown in the present drawings is merely for the purpose of illustrating this movement. Such universal movement of the driving unit is free and unrestricted by structural interferences, sufficient play being allowed to compensate for a reasonably large range of variation in track levels and conditions.

The rear driving unit and truck has a three-point connection with the frame instead of a two-point connection as in the case of the front unit. One of these points is through a universal connection with the transverse frame beam 13 similar to the connection of the front unit on the beam 12, shown in Fig. 3. The other two points of connection are through journal springs interposed between the frame and the journal boxes. Coil compression springs 52 are at present employed for this purpose, suitable spring retainers being provided for holding the ends of the springs in place between the frame and the journal boxes 53 for the rear axle. Each lower spring cap rests on its respective box in a transverse slot to permit limited lateral movement of the truck with respect to the frame, although this play may be allowed by the springs. These journal boxes are similar in construction to those employed for the front axle, and they likewise co-operate in a similar manner with their pedestal jaws.

From the foregoing, it will be evident that the locomotive frame is suspended on one of trucks at laterally spaced points as through the journal springs 52 and on the other truck at a median point longitudinally spaced from said journal springs as through the pin 39, upon which the equalizing saddle turns. It will also be evident that there is embodied in each truck, a motor and gearing between the motor and drive wheel axle, and that this organization of parts constitutes a unit of assembly attached to the frame by a universal connection, upon and about which the unit is adapted to swivel and through which the driving thrust is imparted. The foregoing not only gives a very compact and efficient organization of propelling parts, but provides an exceptionally flexible association of these parts with the locomotive frame, without, however, depreciating from the strength and sturdiness required for heavy duty service. The capacity of the trucks to swing laterally and tilt vertically, and in fact, to move universally about their respective attachments to the frame, together with the compensating suspension of the frame upon trucks, give an exceptional flexibility, which promotes smoothness and ease of operation, and which also materially reduces bending strains and stresses and frictional wear of parts.

It is believed that the foregoing conveys a clear understanding of our invention, and while we have illustrated a single working embodiment, it should be understood that considerable changes might be made in the design and construction of locomotives embodying our invention without departing from its spirit and scope as explained in the appended claims:

We claim:

1. In a locomotive, the combination with a frame, a motor-driven wheel-supported driving unit pivotally attached to the frame at a point longitudinally spaced from the wheel axis, upon and about which point of attachment said unit is movable vertically and laterally with respect to the frame and through which attachment the driving thrust is imparted, and a transverse equalizer suspending the frame on said driving unit.

2. A locomotive comprising a frame, a plurality of motor-driven wheel-supported driving units, each pivotally attached to the frame at a point longitudinally spaced from its wheel axis with capacity for vertical and lateral movement as a unit upon and about said point of attachment, through which attachment the driving thrust is imparted, a two-point suspension for the frame on one of said driving units and a single-point equalizer suspension for the frame on another of said units.

3. In a locomotive, the combination of a front and a rear two-wheel motor-driven truck, a frame suspended at two points on the rear truck and at a single point on the front truck, and a driving thrust connection between each truck and the frame independent of said frame suspension points, permitting universal movement of the truck upon and about such connection.

4. A locomotive comprising a pair of motor-driven trucks, a frame, means suspending the frame on one truck at laterally spaced points and on the other truck at a median point longitudinally spaced from the first mentioned points of suspension, and a driving thrust connection between each truck and the frame at a median point longitudinally spaced from its respective point or points of suspension, permitting universal movement of the truck upon and about its driving thrust connection.

5. A locomotive comprising a frame, a two-wheel truck upon which the frame is suspended through the the agency of journal springs on the wheel axle journal boxes, and a second two-wheel truck upon which the frame is suspended through the agency of a transverse equalizer resting at its ends on the journal boxes and pivoted intermediate its ends on the frame to swing about a horizontally disposed axis extending longitudinally of the frame.

6. A locomotive comprising a frame, a two-wheel motor-driven truck having a three-point connection with the frame, through two of which points laterally spaced, the frame is suspended, and a second two-wheel motor-driven truck having a two-point connection with the frame, through one of which points centrally between the sides, the frame is suspended.

7. In a locomotive, the combination of a frame, a wheel-supported truck upon which the frame is directly suspended through the agency of journal springs, and a second wheel-supported truck upon which the frame is directly suspended through the agency of a transverse equalizer having a pivotal connection with the frame substantially on the longitudinal center thereof.

8. A locomotive comprising a frame, a front and a rear pair of drive wheels, an axle for each pair of wheels, journal springs between one axle and the frame providing a two-point support therefor, an equalizer saddle between the other axle and the frame providing a single-point support therefor, and a motor for driving each axle, each motor being supported at one end on its respective axle and at its opposite end through a universal connection with the frame.

9. A locomotive comprising a frame, a rear two-wheel motor-driven truck on which the frame is suspended through journal springs and which has a ball and socket connection with the frame at a median point, through which latter connection the driving thrust is imparted, and a front two-wheel motor-driven truck on which the frame is suspended at a single median point through an equalizer saddle and which has at a median point longitudinally spaced therefrom a ball and socket connection, through which latter connection the driving thrust of the front motor is imparted.

10. In a locomotive, a pair of drive wheels and an axle therefor, a frame suspended on the axle, a motor, a gear drive connection between the motor and axle, a casing for said drive connection journaled on the axle, and rigidly attached to the motor casing, and a universal connection between the motor casing and the frame through which the driving thrust is imparted.

11. In a locomotive, the combination of a frame, a pair of drive wheels, journal boxes for the wheels, and an equalizer supporting the frame on the journal boxes and comprising a transverse lever pivoted on the frame on a horizontal axis on the longitudinal center-line thereof and connected at its ends with the journal boxes.

12. In a locomotive, the combination of a frame, a pair of drive wheels, journal boxes for the wheels, an equalizer supporting the frame on the journal boxes and comprising a transverse lever pivoted medially on the frame, and a translating link between each outer end of said equalizer lever and the adjacent journal box.

13. In a locomotive, a frame having rigid pedestal jaws at each side, a journal box associated with the pedestal jaws at each side with capacity for a limited amount of vertical and lateral movement therebetween, driving wheels and an axle therefor journaled in said journal boxes, a motor in driving connection with the axle and constituting therewith a driving unit, means suspending the frame on the journal boxes, and a driving thrust connection between the frame and said driving unit through the agency of a ball and socket connection at a point longitudinally spaced from the axle and permitting movement of said driving unit vertically and laterally upon and about said connection.

14. In a locomotive, a frame having rigid pedestal jaws at each side, a journal box associated with the pedestal jaws at each side with capacity for a limited amount of vertical and lateral movement therebetween, driving wheels and an axle therefor journaled in said journal boxes, a motor in driving connection with the axle and constituting therewith a driving unit, a driving thrust connection between the frame and said driving unit at a point longitudinally spaced from the axle and permitting movement of said driving unit vertically and laterally upon and about said connection, a transverse equalizer lever pivoted on the frame, and a frame-supporting connection between each outer end of said equalizer lever and the adjacent journal box.

15. In a locomotive, the combination of a frame having at each side a pair of rigid pedestal jaws, a journal box vertically slidable and laterally movable between each pair of jaws, drive wheels, an axle therefor journaled in said journal boxes, a motor for driving said axle and constituting therewith a driving unit, a driving thrust connection between said driving unit and the frame through the agency of a ball and socket connection at a point longitudinally spaced from the axle, through which the driving thrust is imparted and upon and about which said driving unit is vertically and laterally movable with respect to the frame, and means suspending the frame on said driving unit.

16. In a locomotive, the combination of a frame having at each side a pair of rigid pedestal jaws, a journal box vertically slidable and laterally movable between each pair of jaws, drive wheels, an axle therefor journaled in said journal boxes, a motor for driving said axle and constituting therewith a driving unit, a driving thrust connection between said driving unit and the frame through the agency of a ball and socket connection at a point longitudinally spaced from the axle, through which the driving thrust is imparted and upon and about which said driving unit is vertically and laterally movable with respect to the frame, and journal springs interposed between the journal boxes and the frame for suspending the latter.

17. In a locomotive, the combination of a frame having at each side a pair of rigid pedestal jaws, a journal box vertically slidable and laterally movable between each pair of jaws, drive wheels, an axle therefor journaled in said journal boxes, a motor for driving said axle and constituting therewith a driving unit, a driving thrust connection between said driving unit and the frame at a point longitudinally spaced from the axle, through which the driving thrust is imparted and upon and about which said driving unit is vertically and laterally movable with respect to the frame, and a transverse equalizer lever pivoted on the frame and connected at its ends with the journal boxes, providing an equalizing suspension for the frame on said driving unit.

18. A locomotive comprising a frame having side members joined by end members and intermediate transverse beams spaced apart longitudinally of the frame, a wheel supported, motor-driven driving unit pivotally attached to each of said transverse beams, medially between the ends thereof and at a point on the unit longitudinally spaced from its wheel axis, said driving units being movable upon and about said pivotal connections vertically and laterally with respect to the frame, and means suspending the frame on said units.

19. A locomotive comprising a frame having side members joined by end members and intermediate transverse beams spaced apart longitudinally of the frame, a wheel-supported, motor-driven driving unit pivotally attached to each of said transverse beams, medially between the ends thereof and at a point on the unit longitudinally spaced from its wheel axis, said driving units being movable upon and about said pivotal connections vertically and laterally with respect to the frame, and a compensating suspension for the frame upon said driving units.

20. In a locomotive, the combination of a frame, a pair of drive wheels, an axle carried thereby, a worm gear fixed to the axle, a shaft having a worm meshing with said worm gear, a motor, the driving shaft of which is concentric with and adapted for driving said worm shaft, a casing in which said worm shaft is journaled and which in turn is journaled on the axle and rigidly united to the motor, a universal connection between the motor and the frame through which the driving thrust is imparted, said motor, driving-wheel axle and intermediate parts constituting a driving unit or truck having capacity for movement upon and about said driving thrust connection vertically and laterally with respect to the frame, and means suspending the frame upon said driving unit.

21. In a locomotive, the combination of a frame, a pair of drive wheels, an axle therefor, a gear fixed to the axle, a motor positioned at one side of the axle and having a driving connection with said gear, means supporting the driving end of the motor on the axle in relatively rigid relation thereto, so that the motor and axle and intermediate parts constitute a driving unit, a pivotal connection between the opposite end of the motor and the frame through which the driving thrust is imparted and upon and about which the driving unit is movable vertically and laterally with respect to the frame, and a transverse equalizing device suspending the frame on the axle ends of said driving unit.

22. In a locomotive, in combination, a frame having a transverse beam; a driving truck comprising driving wheels, an axle therefor, a motor having a close-coupled driving connection with the axle and supported at one end thereon; means suspending the frame on the axle of the driving truck; and a pivotal connection between the under side of the motor casing and said transverse beam through which connection driving thrust is imparted.

23. In a locomotive, in combination, a frame having a transverse beam; a driving truck comprising driving wheels, an axle therefor, a motor having a close-coupled driving connection with the axle and supported at one end thereon; means suspending the frame on the axle of the driving truck; and a ball and socket connection between the under side of the motor casing and said transverse beam through which connection driving thrust is imparted.

24. In a locomotive, in combination, a driving truck including a pair of driving wheels, an axle therefor, and a motor having a driving connection with the axle and supported at one end thereof; a frame structure including a transverse beam at a relatively low position; means suspending the frame structure on the axle end of the driving truck; the opposite end of the motor overlying said transverse beam and being supported thereon through means of a swivel connection through which driving thrust is imparted to the frame structure.

25. In a locomotive, in combination, a frame structure having a transverse beam at a relatively low position; a driving truck including driving wheels, an axle therefor, a motor connected with the axle and mounted at one end thereon and overlying at its opposite end said transverse beam; a pivotal connection between the motor and said transverse beam; and an equalizing suspension between the frame structure and axle end of the driving truck through which the frame structure is supported on the truck through a single pivotal connection disposed substantially on the longitudinal center of the locomotive.

26. In a locomotive, in combination, a frame structure, a driving truck including a pair of drive wheels, an axle therefor, journal boxes on the axle, and a motor having driving connection with the axle and journaled at one end thereon; a drive-transmitting connection between the opposite end of the motor and the frame structure; and an equalizing saddle extending transversely of the frame structure and pivotally mounted thereon substantially on its longitudinal center, and means operative between the ends of said equalizing saddle and the journal boxes whereby the frame structure is suspended on the axle end of the driving truck through the agency of the equalizing saddle.

27. In a locomotive, in combination, a frame structure, a driving truck including a pair of drive wheels, an axle therefor, journal boxes on the axle, and a motor having driving connection with the axle and journaled at one end thereon; a drive-transmitting connection between the opposite end of the motor and the frame structure; and an equalizing saddle extending transversely of the frame structure and pivotally mounted thereon substantially on its longitudinal center, said equalizing saddle having laminated springs extending from each end, and means operative between the ends of said laminated springs and journal boxes whereby the frame structure is supported on the axle end of the driving truck through the agency of the equalizing saddle.

28. In a locomotive, in combination, a frame structure, a driving truck including a motor driven axle, journal boxes on the axle, an equalizing saddle extending transversely of the frame structure and pivotally mounted intermediate its ends thereon, and vertically movable means slidably associated with the sides of the frame structure and operative between the ends of the saddle and the journal boxes for supporting the frame structure on the axle through the agency of the equalizing saddle.

29. In a locomotive, in combination, a frame structure, a motor driven truck having journal boxes on its axle, and means operative between said journal boxes and the frame structure for supporting the latter including an equalizing saddle extending transversely of the frame structure and pivotally mounted thereon through a single pivot pin disposed on an axis extending longitudinally of the frame structure.

30. In a railway car, in combination, a frame structure, a pair of wheels, an axle therefor, journal boxes on the axle, a transverse equalizing saddle pivotally mounted intermediate its ends on the frame structure to turn about an axis extending longitudinally thereof, and means operative between the ends of the equalizing saddle and the journal boxes whereby the frame structure is supported on the axle through the agency of the equalizing saddle.

31. In a railway car, in combination, a frame structure, a pair of wheels, an axle therefor, journal boxes on the axle, a transverse equalizing saddle pivotally mounted intermediate its ends on the frame structure on an axis extending longitudinally thereof, and means associated with each side of the frame structure and operative between the adjacent end of the equalizing saddle and the adjacent journal box whereby the frame structure is supported on the axle through the agency of the equalizing saddle.

32. In a railway car, in combination, a frame structure having sides provided with pedestal jaws, a pair of wheels, an axle therefor, journal boxes on the axle associated with said pedestal jaws and adapted to move vertically with respect thereto, a transverse equalizing device mounted on the frame structure to swing about an axis extending longitudinally thereof, and means vertically slidable in connection with each side of the frame structure and operative between the adjacent journal box and equalizing device whereby the frame structure is supported on the axle through the agency of the equalizing device.

33. In a railway car, in combination, a frame structure, a pair of wheels, an axle therefor, journal boxes on the axle capable of a limited vertical and lateral movement with respect to the sides of the frame structure, a transverse equalizing device mounted on the frame structure, and means operative between each end of the equalizing device and the adjacent journal box including a shoe vertically movable with respect to the side of the frame structure and connected with the journal box with capacity for the latter to move laterally.

34. In a railway car, in combination, a frame structure having sides, a pair of wheels, an axle therefor, journal boxes on the axle, a transverse equalizing device mounted on the frame structure intermediate its sides and terminating at each end in laminated springs, and vertical translating links slidably associated with the sides of the frame structure and operative between the outer ends of the laminated springs and each journal box whereby the frame structure is supported on the axle through the agency of the equalizing device.

35. In a locomotive, in combination, a frame structure, a front motor driven truck, a rear motor driven truck, the motor of each truck being located forward of its wheel axle and having a thrust-imparting connection with the frame structure, and a three-point suspension between the frame structure and the axle end of both driving trucks.

36. In a locomotive, in combination, a frame structure, a front motor driven truck, a rear motor driven truck, the motor of each truck being located forward of its wheel axle and having a thrust-imparting connection with the frame structure, and a three-point suspension between the frame structure and the axle and of both driving trucks, said suspension comprising an individual spring suspension between the frame and the journal boxes of one of said trucks providing two points of support and an equalizing device operative between the frame structure and the journal boxes of the other truck providing the third point of support.

37. In a locomotive, in combination, a frame structure, two individual motor driven trucks in tandem relation each having a drive-transmitting connection with the frame structure, and a three-point suspension for the frame structure on the axle ends of both trucks including a spring suspension between each journal box of one of said trucks and the frame structure providing two points of support and an equalizing device between both journal boxes of the other truck and the frame structure providing the third point of support.

38. A four-wheel drive locomotive of the character described, including two independent motor driven trucks and a frame structure having a three-point suspension on said trucks.

39. A four-wheel drive locomotive of the character described, having its frame structure supported on the journal boxes of one pair of drive wheels providing two points of support and on the journal boxes of the other drive wheels through the agency of an equalizing device providing a third point of support.

40. A four-wheel locomotive of the character described, in which the frame structure has a three-point support on said wheels, two points being through the journal boxes of one pair of wheels and the third point being through the intermediary of an equalizing device resting on the journal boxes of the other pair of wheels.

41. A locomotive having two independent motor driven trucks, and a frame structure having a three-point suspension on said trucks, two points being through the journal boxes of one truck and the third point being through the agency of an equalizing device having suspension on the journal boxes of the other truck.

42. A locomotive having two individual motor driven trucks, and a frame structure having independent support on each of the journal boxes of one of the trucks, and an equalizing support on the journal boxes of the other truck.

WILLIAM C. WHITCOMB.
WILLIAM F. ECKERT.